United States Patent
Ohyama et al.

(10) Patent No.: US 8,202,650 B2
(45) Date of Patent: Jun. 19, 2012

(54) NEGATIVE ELECTRODE MATERIAL FOR NICKEL-METAL HYDRIDE BATTERY AND TREATMENT METHOD THEREOF, AND NICKEL-METAL HYDRIDE BATTERY

(75) Inventors: Hideaki Ohyama, Kanagawa (JP); Kyoko Nakatsuji, Kanagawa (JP); Susumu Kikuyama, Kanagawa (JP); Yoshitaka Dansui, Kanagawa (JP)

(73) Assignee: Panasonic Corporation, Osaka (JP)

( * ) Notice: Subject to any disclaimer, the term of this patent is extended or adjusted under 35 U.S.C. 154(b) by 457 days.

(21) Appl. No.: 12/518,607
(22) PCT Filed: Feb. 20, 2008
(86) PCT No.: PCT/JP2008/000288
§ 371 (c)(1), (2), (4) Date: Jun. 10, 2009
(87) PCT Pub. No.: WO2009/013848
PCT Pub. Date: Jan. 29, 2009

(65) Prior Publication Data
US 2010/0028774 A1 Feb. 4, 2010

(30) Foreign Application Priority Data
Jul. 24, 2007 (JP) ................................ 2007-191716

(51) Int. Cl.
*H01M 4/58* (2010.01)
(52) U.S. Cl. .................. 429/218.2; 429/218.1; 429/223
(58) Field of Classification Search ............... 429/218.2, 429/223, 218.1
See application file for complete search history.

(56) References Cited

U.S. PATENT DOCUMENTS

| | | | |
|---|---|---|---|
| 5,470,675 A | 11/1995 | Einerhand et al. | |
| 5,512,385 A * | 4/1996 | Komori et al. | 429/101 |
| 6,284,409 B1 | 9/2001 | Higashiyama et al. | |
| 2004/0170520 A1 | 9/2004 | Maeda et al. | |
| 2004/0194577 A1* | 10/2004 | Fetcenko et al. | 75/255 |
| 2006/0046141 A1* | 3/2006 | Yasuoka et al. | 429/218.2 |
| 2006/0166099 A1 | 7/2006 | Okabe et al. | |
| 2010/0028774 A1 | 2/2010 | Ohyama et al. | |

FOREIGN PATENT DOCUMENTS

CN  1610151 A  4/2005
(Continued)

OTHER PUBLICATIONS

X. Zhang et al. "The structure and electrochemical characteristics of La0.67Mg0.33 (Ni0.8Co0.1 Mn0.1)X (X=2.5-5.0) multiphase alloys for nickel-metal hydride batteries." J. Solid State Electrochem. 10 (2006): 236-242.*

(Continued)

*Primary Examiner* — Barbara Gilliam
*Assistant Examiner* — Zachary Best
(74) *Attorney, Agent, or Firm* — McDermott Will & Emery LLP (57) ABSTRACT

A negative electrode material for a nickel-metal hydride battery containing a hydrogen-absorbing alloy represented by a general formula: $Mm_{1-a}T^1{}_aNi_xAl_yMn_zCo_bT^2{}_c$, in which: Mm is at least one of light rare earth elements; $T^1$ is at least one selected from the group consisting of Mg, Ca, Sr and Ba; $T^2$ is at least one selected from the group consisting of Sn, Cu and Fe; and $0.015 \leq a \leq 0.5$, $2.5 \leq x \leq 4.5$, $0.05 \leq y+z \leq 2$, $0 \leq b \leq 0.6$, $0 \leq c \leq 0.6$ and $5.6 \leq x+y+z+b+c \leq 6$ are satisfied.

10 Claims, 2 Drawing Sheets

FOREIGN PATENT DOCUMENTS

| | | |
|---|---|---|
| CN | 1739210 A | 2/2006 |
| EP | 0 860 889 A1 | 8/1998 |
| JP | 05-033088 | 2/1993 |
| JP | 2000-164221 | 6/2000 |
| JP | 2001-216960 | 8/2001 |
| JP | 2001-294958 | 10/2001 |
| JP | 2002-042802 | 2/2002 |
| JP | 2002-042803 | 2/2002 |
| JP | 2002-069511 | 3/2002 |
| JP | 2002-080925 | 3/2002 |
| JP | 2003-323889 | 11/2003 |
| JP | 2004-119271 | 4/2004 |
| JP | 2008-053223 | 3/2008 |

OTHER PUBLICATIONS

X. Zhang et al. "Crystal structure and electrochemical properties of rare earth non-stoichiometric AB5-type alloy as anegative electrode material in Ni-MH battery." J. Sol. State Chem. 177 (2004): 2373-2377.*

Chinese Office Action issued in Chinese Patent Application No. 200880002452.6, dated Nov. 29, 2010.

European Search Report issued in European Patent Application No. 08710441.0 dated Dec. 15, 2011.

* cited by examiner

NEGATIVE ELECTRODE MATERIAL FOR NICKEL-METAL HYDRIDE BATTERY AND TREATMENT METHOD THEREOF, AND NICKEL-METAL HYDRIDE BATTERY

RELATED APPLICATIONS

This application is the U.S. National Phase under 35 U.S.C. §371 of International Application No. PCT/JP2008/000288, filed on Feb. 20, 2008, which in turn claims the benefit of Japanese Application No. 2007-191716, filed on Jul. 24, 2007, the disclosures of which Applications are incorporated by reference herein.

TECHNICAL FIELD

The present invention relates to a negative electrode material used in a nickel-metal hydride battery, particularly to an improvement of a composition of a hydrogen-absorbing alloy powder that constitutes the negative electrode material.

BACKGROUND ART

Nickel-metal hydride batteries, which use a hydrogen-absorbing alloy powder as the negative electrode material, are gaining attention as a power supply for electric cars and the like, since durability (life characteristics and storage characteristics) is high, and further, output characteristics are excellent. In recent years, lithium-ion secondary batteries are also gradually making an entry for such intended use. Accordingly, in terms of emphasizing the advantages of nickel-metal hydride batteries, further improvements in output characteristics and durability are being anticipated.

As the negative electrode material, a hydrogen-absorbing alloy powder having a $CaCu_5$-type ($AB_5$-type) crystal structure is mainly used. However, in terms of improving durability, in the case of $MmNi_5$ (Mm is at least one of rare earth elements) for example, substituting a part of Ni with Co, Mn, Al, Cu and the like is often the case. In addition, in terms of aiming to achieve higher capacity while also improving durability, substituting a part of Site A with a Group 2A element such as Mg, Ca and Sr is being proposed. According to this proposal, the hydrogen absorption amount within a predetermined pressure range (hereinafter referred to as PCT capacity) increases (c.f., Patent Document 1). In addition, preventing elution of Mn and suppressing degradation of discharge characteristics by substituting a part of Site B with Mg are being proposed (c.f., Patent Document 2).

Patent Document 1: Japanese Laid-Open Patent Publication No. 2002-42802
Patent Document 2: Japanese Laid-Open Patent Publication No. 2004-119271

DISCLOSURE OF THE INVENTION

Problem to be Solved by the Invention

According to Patent Documents 1 and 2, high capacity can be achieved and degradation of discharge characteristics can also be suppressed. However, the proposed negative electrode material lacks sufficient high-temperature life characteristics.

As with Patent Document 1, in the case where a part of Site A is substituted with a Group 2A element, if the Group 2A element amount is small, the hydrogen-absorbing alloy powder degrades when charging and discharging are repeated under a high temperature.

As with Patent Document 2, in the case where a part of Site B is substituted with Mg, the fact that Mg is ordinarily stable at Site A causes the substitution to become incomplete, and thus, Mg is locally distributed on the alloy surface and at the grain boundary. As a result, the hydrogen absorption reaction via a Ni layer diminishes. Thus, battery reaction becomes insufficient when charging and discharging are repeated.

Means for Solving the Problem

An object of the present invention is to improve battery characteristics of a nickel-metal hydride battery without damaging high-temperature life characteristics, by improving the negative electrode material.

The present invention relates to a negative electrode material for a nickel-metal hydride battery, which contains a hydrogen-absorbing alloy represented by a general formula: $Mm_{1-a}T^1_a Ni_x Al_y Mn_z Co_b T^2_c$, in which: Mm is at least one of light rare earth elements; $T^1$ is at least one selected from the group consisting of Mg, Ca, Sr and Ba; $T^2$ is at least one selected from the group consisting of Sn, Cu and Fe; and $0.015 \leq a \leq 0.5$, $2.5 \leq x \leq 4.5$, $0.05 \leq y+z \leq 2$, $0 \leq b \leq 0.6$, $0 \leq c \leq 0.6$ and $5.6 \leq x+y+z+b+c \leq 6$ are satisfied. The hydrogen-absorbing alloy may include other elements as an inevitable impurity.

In a preferred embodiment of the present invention, Mm is La. That is, in the preferred embodiment of the present invention, the hydrogen-absorbing alloy is represented by the general formula: $La_{1-a}T^1_a Ni_x Al_y Mn_z Co_b T^2_c$. Mm may include light rare earth elements other than La as an inevitable impurity.

In the case where Mm is La, $T^1$ is preferably Mg. Further, $b=0$, $T^2_c = Fe_d Sn_e$ and $d+e=c$ are preferably satisfied. That is, in a preferred embodiment of the present invention, the hydrogen-absorbing alloy is represented by a general formula: $La_{1-a}Mg_a Ni_x Al_y Mn_z Fe_d Sn_e$. $T^1$ may include elements other than Mg as an inevitable impurity.

It is preferable that the negative electrode material for a nickel-metal hydride battery of the present invention is made to come into contact with an alkaline aqueous solution to be activated and then used.

The present invention, in addition, relates to a nickel-metal hydride battery provided with a positive electrode, a negative electrode and an alkaline electrolyte solution, in which the negative electrode includes the above-mentioned negative electrode material for a nickel-metal hydride battery.

The present invention further relates to a method for treating a negative electrode material for a nickel-metal hydride battery, which includes the step of bringing the above-mentioned negative electrode material for a nickel-metal hydride battery into contact with an alkaline aqueous solution. The step of bringing the negative electrode material into contact with the alkaline aqueous solution is performed, for example, by stirring the negative electrode material in the alkaline aqueous solution.

Here, the alkaline aqueous solution preferably contains at least one of sodium hydroxide and potassium hydroxide. In the case where the alkaline aqueous solution is an aqueous potassium hydroxide solution, the potassium hydroxide concentration is preferably 3 to 20 mol/L. In the case where the alkaline aqueous solution is an aqueous sodium hydroxide solution, the sodium hydroxide concentration is preferably 10 to 20 mol/L. The temperature of the alkaline aqueous solution is preferably 80 to 150° C.

Effect of the Invention

The negative electrode material for a nickel-metal hydride battery of the present invention is composed of a new hydrogen-absorbing alloy powder, in which grain boundary has a high corrosion resistance and hydrogen absorption reaction is not inhibited. Thus, a nickel-metal hydride battery including the negative electrode material of the present invention is improved in discharge efficiency under high temperatures, and capacity reduction is rarely caused when charging and discharging are repeated.

BEST MODE FOR CARRYING OUT THE INVENTION

In a hydrogen-absorbing alloy having an $AB_5$-type crystal structure, when Site A is substituted with a small amount of a Group 2A element, the hydrogen-absorbing alloy degrades when charging and discharging are repeated under a high temperature. In addition, when Site B is substituted with Mg, battery reaction becomes insufficient. In view of the above, the present invention provides a nickel-metal hydride battery containing a hydrogen-absorbing alloy represented by a general formula: $Mm_{1-a}T^1_a Ni_x Al_y Mn_z Co_b T^2_c$. Here, Mm is at least one light rare earth element. A light rare earth element is specifically referred to as La, Ce, Nd, Pr, Sm and the like. The main component of Mm is La, and it is common for Mm to contain La in an amount being 10 wt % or more and 50 wt % or less.

$T^1$ may be at least one selected from the group consisting of Mg, Ca, Sr and Ba. Mg is preferable as $T^1$, since Mg can easily form a hydride.

$T^2$ may be at least one selected from the group consisting of Sn, Cu and Fe. In terms of improving resistance against expansion and contraction of an alloy, at least one of Fe and Sn is preferable as $T^2$.

That is, in the present invention, Site A of the $AB_5$-type hydrogen-absorbing alloy is substituted with a comparatively large amount of the Group 2A element ($T^1$). In addition, the stoichiometric ratio of B/A, that is, the ratio of: the number of moles of $(Mm+T^1)$; relative to the number of moles of $(Ni+Al+Mn+Co+T^2)$, is controlled to be 5.6 or more and 6 or less. Due to this, equilibrium pressure between hydrogen and the alloy under a high temperature drops, the flatness of the equilibrium pressure increases, and thus, PCT capacity increases.

The reason for being able to obtain the above effect is considered as follows. By substituting Site A with a comparatively large amount of a Group 2A element as well as controlling the stoichiometric ratio of B/A, amorphorization of the Group 2A element and Ni of Site B is promoted. As a result, a highly-corrosion-resistant grain boundary layer is formed in the hydrogen-absorbing alloy.

Figure 1:
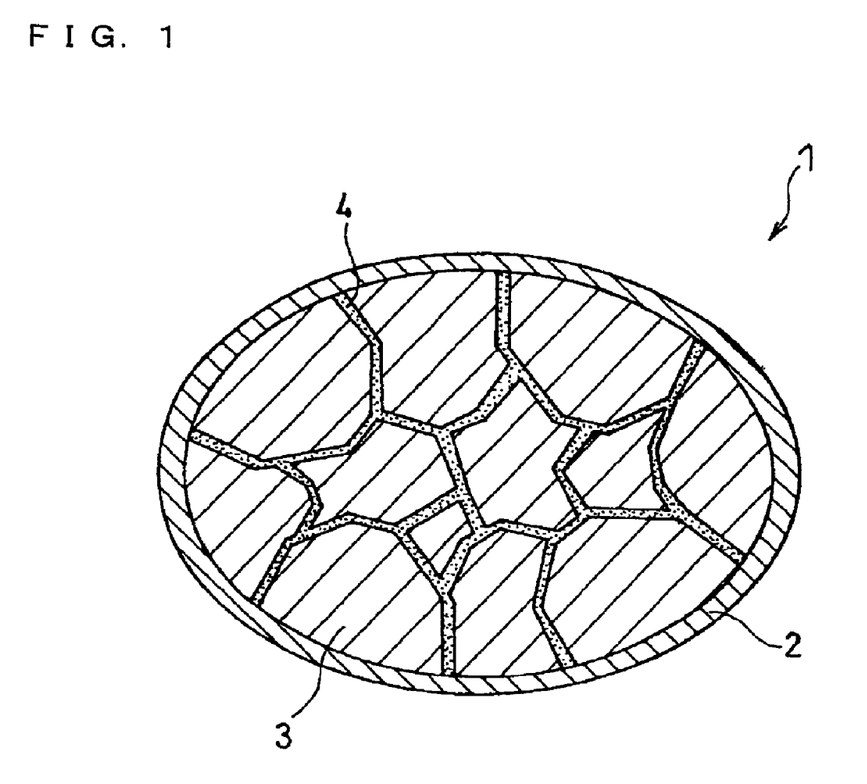
FIG. 1 is a sectional view schematically illustrating a hydrogen-absorbing alloy particle that constitutes a negative electrode material for a nickel-metal hydride battery of the present invention.

FIG. 1 is a sectional view schematically illustrating a hydrogen-absorbing alloy particle that constitutes a negative electrode material for a nickel-metal hydride battery of the present invention. On the surface of a hydrogen-absorbing alloy particle 1, a Ni layer 2 is locally distributed. The hydrogen-absorbing alloy particle 1 contains a plurality of small particles 3. In between small particles 3, a grain boundary is present. At the grain boundary, an amorphous grain boundary layer 4 that contains the Group 2A element and Ni of Site B is formed. The amorphous grain boundary layer 4 is connected to the Ni layer 2 that is locally distributed on the surface of the hydrogen-absorbing alloy particle 1. The grain boundary layer 4 serves as a transfer path for hydrogen ions (protons). Thus, it becomes easier for hydrogen ions to reach the Ni layer 2 that is locally distributed on the alloy surface.

The above general formula satisfies $0.015 \leq a \leq 0.5$, $2.5 \leq x \leq 4.5$, $0.05 \leq y+z \leq 2$, $0 \leq b \leq 0.6$, $0 \leq c \leq 0.6$, and $5.6 \leq x+y+z+b+c \leq 6$.

When "a" becomes less than 0.015 (the amount of $T^1$ is too small), achieving high capacity for the negative electrode material becomes difficult. When "a" exceeds 0.5 (the amount of $T^1$ is too large), segregation of $T^1$ becomes apparent. It is preferable that $0.02 \leq a$, $0.03 \leq a$ or $0.05 \leq a$. In addition, it is preferable that $a \leq 0.4$ or $a \leq 0.35$.

When "x" becomes less than 2.5 (the amount of Ni is too small), capacity reduction becomes remarkable. When "x" exceeds 4.5 (the amount of Ni is too large), still, capacity reduction becomes remarkable. It is preferable that $3.5 \leq x \leq 4.2$.

When "y+z" becomes less than 0.05 (the total amount of Al and Mn is too small), the hydrogen equilibrium pressure rises and the capacity becomes low. When "y+z" exceeds 2, (the total amount of Al and Mn is too large), elution of Mn and Al from the negative electrode into the alkaline electrolyte solution becomes excessive after the fabrication of nickel-metal hydride battery. Thus, high-temperature life characteristics degrade. It is preferable that $0.4 \leq y+z \leq 1.5$.

The numeric "b" may be 0, but in terms of further improving resistance against expansion and contraction of the alloy, 0.3 or more is preferable. When "b" exceeds 0.6 (the amount of Co is too large), elution of Co from the negative electrode into the alkaline electrolyte solution becomes excessive after the fabrication of nickel-metal hydride battery. Thus, high-temperature life characteristics degrade. It is preferable that $0.3 \leq b \leq 0.5$.

The numeric "c" may be 0, but in terms of further improving resistance against expansion and contraction of the alloy, 0.1 or more is preferable. When "c" exceeds 0.6 (the amount of $T^2$ is too large), segregation of $T^2$ occurs. Then, oxidation and passivation of $T^2$ occur, thereby inhibiting absorption and desorption reactions of hydrogen, and thus, capacity becomes low. It is preferable that $0.1 \leq c \leq 0.4$.

When "x+y+z+b+c" becomes less than 5.6 (the stoichiometric ratio of B/A is too small), amorphorization of the Group 2A element at Site A and Ni at Site B is not promoted. Thus, capacity does not sufficiently increase. When "x+y+z+b+c" exceeds 6 (the stoichiometric ratio of B/A is too large), composition becomes excessively non-stoichiometric, and capacity reduction becomes remarkable. It is preferable that $5.6 \leq x+y+z+b+c \leq 5.8$.

In a preferred embodiment of the present invention, the hydrogen-absorbing alloy is represented by a general formula: $La_{1-a}T^1_a Ni_x Al_y Mn_z Co_b T^2_c$. In addition, in a preferred embodiment of the present invention, the hydrogen-absorbing alloy is represented by a general formula: $La_{1-a}Mg_a Ni_x Al_y Mn_z Fe_d Sn_e$. Herein, $0.1 \leq d \leq 0.4$ and $0.1 \leq e \leq 0.4$ are preferable. In addition, since $d+e=c$, $0.1 \leq d+e \leq 0.4$ is preferable.

It is preferable that the negative electrode material for a nickel-metal hydride battery is made to come into contact with an alkaline aqueous solution to be activated and then used. As a treatment method for the activation, a method in which the negative electrode material of a nickel-metal hydride battery is brought into contact with the alkaline aqueous solution is preferable. For example, the negative electrode material is stirred in the alkaline aqueous solution. For example, 70 to 100 minutes is preferable as the time for bringing the negative electrode material into contact with the alkaline aqueous solution. The treatment using the alkaline aqueous solution causes Ni to be locally distributed on the surface of the hydrogen-absorbing alloy particle. An Ni layer formed as such serves as a catalyst that promotes absorption and desorption of hydrogen.

The average particle size (median diameter based on volume) of the negative electrode material when brought into contact with the alkaline aqueous solution, is preferably 20 to 50 μm.

The alkaline aqueous solution preferably contains at least one of sodium hydroxide and potassium hydroxide.

In the case of an aqueous potassium hydroxide solution, the potassium hydroxide (KOH) concentration is preferably 3 to 20 mol/L, and more preferably 10 to 15 mol/L. In the case where the KOH concentration is less than 3 mol/L, surface treatment may not sufficiently proceed. In the case where the concentration exceeds 20 mol/L, KOH may be deposited on the alloy surface even at room temperature, and productivity as well as reproducibility may decline.

In the case of an aqueous sodium hydroxide solution, the sodium hydroxide (NaOH) concentration is preferably 10 to 20 mol/L, and more preferably, 12 to 15 mol/L. In the case where the NaOH concentration is less than 10 mol/L, surface treatment may not sufficiently proceed, since removal of redeposits does not proceed. In the case where the concentration exceeds 20 mol/L, NaOH may be deposited on the alloy surface even at room temperature, and productivity as well as reproducibility may decline.

The temperature of the alkaline aqueous solution is preferably 80 to 150° C. In the case where the temperature of the alkaline aqueous solution is lower than 80° C., it becomes difficult for formation reaction of the Ni layer to occur. In the case where the temperature of the alkaline aqueous solution exceeds 150° C., the temperature of the alkaline aqueous solution comes close to the boiling point, regardless of the KOH concentration and the NaOH concentration. Thus, problems, such as due to bumping, tend to easily occur. Considering material and structure of the equipment for surface treatment, 80 to 120° C. is realistic as the optimum temperature range.

The apparatus for performing the surface treatment mentioned above includes, for example: a mixing means for mixing a hydrogen-absorbing alloy powder and an alkaline aqueous solution; a heating means for heating the mixture of a hydrogen-absorbing alloy powder and an alkaline aqueous solution; a controlling means for controlling the heating means; an exhausting means for exhausting an effluent of the alkaline aqueous solution to the outside; a pressure-filtrating means for collecting the hydrogen-absorbing alloy powder; and an introducing means for introducing the alkaline aqueous solution into the mixing means and/or the pressure-filtrating means.

The mixing means includes a reactor that accommodates the hydrogen-absorbing alloy powder and the alkaline aqueous solution; and a stirring means such as a stirring blade. The alkaline aqueous solution is introduced into the reactor as required, by the introducing means.

The heating means may be any means, if the mixture of the hydrogen-absorbing alloy powder and the alkaline aqueous solution can be heated thereby. The controlling means, for example, controls the heating means so that the temperature of the mixture is maintained at 80 to 150° C. When ending the surface treatment, the effluent of the alkaline aqueous solution is exhausted from the reactor via the exhausting means.

Finally, the hydrogen-absorbing alloy after the treatment is separated from the alkaline aqueous solution by the pressure-filtering means.

There is no particular limitation to a method for producing the hydrogen-absorbing alloy that constitutes the negative electrode material. For example, methods such as a plasma-arc melting method, a high-frequency melting method, a mold casting method, a mechanical alloying method, a mechanical milling method, a quench-solidification method can be used. For the quench-solidification method, specifically, methods described in "Metal Material Utilization Handbook" (Industrial Research Center of Japan, 1999) such as a roll spinning method, a melt drag method, a direct casting and rolling method, a rotating-liquid-spinning method, a spray forming method, a gas atomization method, a wet spraying method, a splatting method, a quench-solidification ribbon grinding method, a gas spraying and splatting method, a melt extraction method, a spray forming method, and a rotating electrode method can be given.

The mechanical alloying method and the mechanical milling method are effective as an alloying method in terms of being able to easily control size and crystal form of the hydrogen-absorbing alloy powder. The quench-solidification method can be used alone, or used in a combination with the mechanical alloying method.

For the source material of the hydrogen-absorbing alloy, a mixture containing single substances of the elements that constitute the hydrogen-absorbing alloy in a predetermined molar ratio can be used.

Next, a nickel-metal hydride battery will be explained. The nickel-metal hydride battery is provided with a positive electrode, a negative electrode and an alkaline electrolyte solution. The negative electrode includes a negative electrode material mentioned above. For the positive electrode, a known positive electrode including nickel hydroxide as a positive electrode active material can be used. For the negative electrode, a conductive agent, a thickener and a binder can be included as optional components, other than the negative electrode material mentioned above that includes a hydrogen-absorbing alloy.

The conductive agent is not limited and various electron-conductive materials can be used. Particularly preferable are: graphite such as natural graphite (such as scale-like graphite), artificial graphite and expanded graphite; carbon blacks such as acetylene black (AB), ketjen black, channel black, furnace black, lamp black and thermal black; conductive fibers such as a carbon fiber and a metallic fiber; metallic powders such as copper; organic conductive materials such as a polyphenylene derivative; and the like. Especially preferable are artificial graphite, ketjen black, and the carbon fiber. These conductive agents can be used alone or in a combination as a mixture. The surface of the negative electrode material may be covered with the conductive agent. The amount of the conductive agent is not particularly limited, but 0.1 part by weight to 50 parts by weight is preferable and 0.1 part by weight to 30 parts by weight is more preferable, both relative to 100 parts by weight of the negative electrode material for a nickel-metal hydride battery.

The thickener gives viscosity to a negative electrode material mixture paste that includes the negative electrode material. The thickener is not particularly limited, but for example, carboxymethyl cellulose (CMC), a modified carboxymethyl cellulose, polyvinyl alcohol, methyl cellulose, polyethylene oxide and the like are preferable.

The binder renders the negative electrode material adhered to a core member. For the binder, either a thermoplastic resin or a thermosetting resin may be used. As the thermoplastic resin: a styrene-butadiene copolymer rubber (SBR), polyethylene, polypropylene, polytetrafluoroethylene, polyvinylidene fluoride, a tetrafluoroethylene-hexafluoropropylene copolymer, a tetrafluoroethylene-hexafluoropropylene copolymer, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, an ethylene-acrylic acid copolymer, an $Na^+$ ion-cross-linked copolymer of the ethylene-acrylic acid copolymer, an ethylene-methacrylic acid copolymer, an $Na^+$ ion-cross-linked copolymer of the ethylene-methacrylic acid copolymer, an ethylene-methyl acrylate copolymer, an $Na^+$ ion-cross-linked copolymer of the ethylene-methyl acrylate copolymer, an ethylene-methyl methacrylate copolymer, an $Na^+$ ion-cross-linked copolymer of the ethylene-methyl methacrylate copolymer and the like can be used alone or as a mixture.

In the nickel-metal hydride battery, a separator is interposed between the positive electrode and the negative electrode. A polyolefin non-woven fabric is preferable as the separator. Polypropylene is preferable as polyolefin.

An aqueous potassium hydroxide solution having a specific gravity of approximately 1.30 is preferable as the alkaline electrolyte solution. Sodium hydroxide and lithium hydroxide may be further dissolved in the aqueous potassium hydroxide solution.

EXAMPLES

The present invention will be specifically described below based on the Examples, but the present invention is not limited to these Examples.

(i) Fabrication of Hydrogen-Absorbing Alloy Powder (1) Fabrication of Hydrogen-Absorbing Alloy Powder for Examples 1 to 18 and Comparative Examples 1 to 10

Metallic Mm, Mg, Ni, Al, Mn, Co and Fe were mixed in a predetermined ratio, and the mixture was melted at 1480° C. in a high-frequency induction furnace. This melted matter was quenched by a roll quenching method and then solidified to fabricate an ingot of a hydrogen-absorbing alloy represented by a general formula: $Mm_{1-a}Mg_aNi_xAl_yMn_zCo_bFe_c$ (a, b, c, x, y and z are indicated in Table 1). This ingot was heated at 800° C. for 5 hours under an argon atmosphere and was then ground to an average particle size of 30 μm.

(2) Fabrication of Hydrogen-Absorbing Alloy Powder for Examples 19 to 36 and Comparative Examples 11 to 20

Metallic La, Mg, Ni, Al, Mn, Co and Fe were mixed in a predetermined ratio, and the mixture was melted at 1480° C. in a high-frequency induction furnace. This melted matter was quenched by the roll quenching method and then solidified to fabricate an ingot of a hydrogen-absorbing alloy represented by a general formula: $La_{1-a}Mg_aNi_xAl_yMn_zCO_bFe_c$ (a, b, C, x, y and z are indicated in Table 2). This ingot was heated at 800° C. for 5 hours under an argon atmosphere and was then ground to an average particle size of 30 μm.

(3) Fabrication of Hydrogen-Absorbing Alloy Powder for Examples 37 to 51 and Comparative Examples 21 to 28

Metallic La, Mg, Ni, Al, Mn, Fe and Sn were mixed in a predetermined ratio, and the mixture was melted at 1480° C. in a high-frequency induction furnace. This melted matter was quenched by the roll quenching method and then solidified to produce an ingot of a hydrogen-absorbing alloy represented by a general formula: $La_{1-a}Mg_aNi_xAl_yMn_zFe_dSn_e$ (a, b, d, e, x, y and z are indicated in Table 3). This ingot was heated at 800° C. for 5 hours under an argon atmosphere and was then ground to an average particle size of 30 μm.

(ii) PCT Capacity

A PCT measurement was performed in order to measure the amount of hydrogen absorbed in a hydrogen-absorbing alloy powder. By using a PCT device (manufactured by Lesca Corporation), hydrogen was absorbed until the atmosphere surrounding the hydrogen-absorbing alloy reached 3 MPa at 45° C. Then, hydrogen was desorbed until 0.007 MPa. By using the pressure-composition isotherm obtained for the desorption, the PCT capacity was calculated from the hydrogen amount within the range of 0.01 MPa to 0.5 MPa.

(iii) Elution Test

An alkaline elution test was performed on a hydrogen-absorbing alloy in order to evaluate durability of a hydrogen-absorbing alloy powder in a nickel-metal hydride battery. 1 g of the hydrogen-absorbing alloy powder was immersed in 100 ml of an aqueous NaOH solution having a concentration of 48 wt %. The obtained resultant was then held in a constant temperature chamber for 8 hours at 80° C., and the constituent elements of the hydrogen-absorbing alloy powder were eluted into the aqueous NaOH solution. Subsequently, the aqueous NaOH solution was analyzed by an ICP (Induced Couple Plasma Spectroscopy) analysis method, and the concentrations of the detected elements were recorded.

(iv) Fabrication of Negative Electrode

To 100 parts by weight of a negative electrode material containing a hydrogen-absorbing alloy that was fabricated, 0.15 part by weight of carboxymethyl cellulose (CMC) (degree of etherification: 0.7, degree of polymerization: 1600), 0.3 part by weight of acetylene black (AB) and 0.7 part by weight of styrene-butadiene copolymer rubber (SBR) were added. Water was further added to the obtained resultant and then the whole was kneaded to obtain a material mixture paste. The material mixture paste was applied on both faces of a core member including an iron-based punched metal (thickness of 60 μm, pore diameter of 1 mm and open pore ratio of 42%) on which nickel-plating was performed. The resulting material mixture paste layer, after dried, was pressed together with the core member by rollers and then cut to obtain a negative electrode having a thickness of 0.4 mm, width of 35 mm and a capacity of 2200 mAh. It should be noted that at one end portion along the longitudinal direction of the negative electrode, an exposed portion of the core member was provided.

(v) Fabrication of Nickel-Metal Hydride Battery

Figure 2:
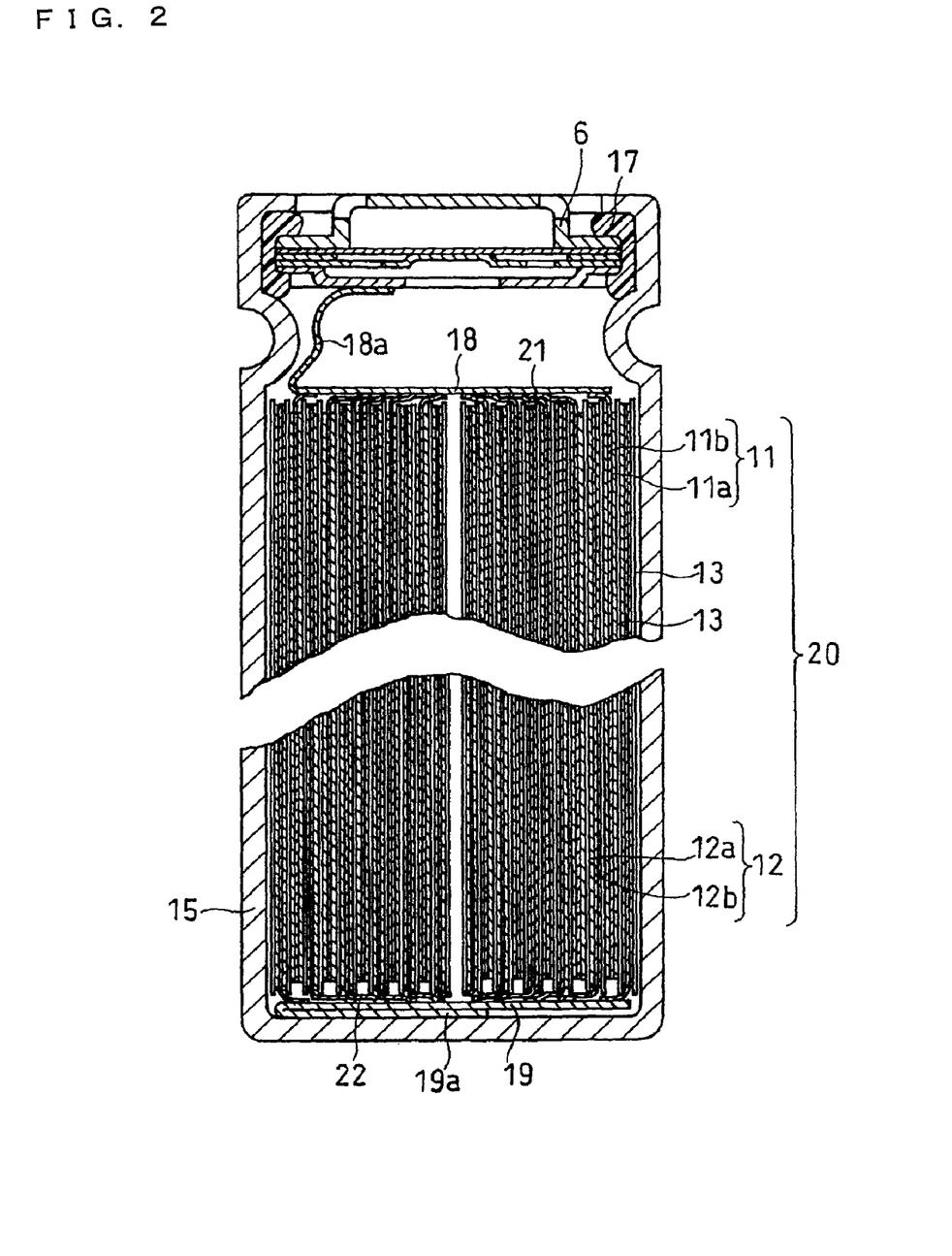
FIG. 2 is a sectional view schematically illustrating a nickel-metal hydride battery according to the Examples of the present invention.

A nickel-metal hydride battery as shown in FIG. 2 was fabricated.

A 4/5A-sized nickel-metal hydride battery having a nominal capacity of 1500 mAh was fabricated, by using a sintered-type nickel positive electrode 11 having a width of 35 mm, a capacity of 1500 mAh and an exposed portion 21 of a core member at one end portion along the longitudinal direction. Specifically, the positive electrode 11 and a negative electrode 12 were wound together with a separator 13 (thickness of 100 μm) made of a sulfonated polypropylene non-woven fabric interposed therebetween, and thus, a columnar electrode plate group 20 was fabricated.

In the electrode plate group 20, the exposed portion 21 of the positive electrode core member 11b not carrying a positive electrode material mixture 11a; and an exposed portion 22 of the negative electrode core member 12b not carrying the negative electrode material mixture 12a were each exposed on per end face thereof, the faces being opposite to one another. A positive electrode current-collecting plate 18 was welded to the end face of the electrode plate group 20 having the exposed portion 21 of the positive electrode core member. A negative electrode current-collecting plate 19 was welded to the end face of the electrode plate group 20 having the exposed portion 22 of the negative electrode core member.

The positive electrode current-collecting plate 18 and a sealing plate 16 were electrically connected to one another via a positive electrode lead 18a. A negative electrode lead 19a was connected to the negative electrode current-collecting plate 19. The electrode plate group 20 was accommodated in a battery case 15 which was a bottomed cylindrical can, with the negative electrode current-collecting plate 19 at the bottom side. Subsequently, the negative electrode lead 19a connected to the negative electrode current-collecting plate 19 was welded to the bottom portion of the battery case 15.

An alkaline electrolyte solution was prepared by dissolving lithium hydroxide at a concentration of 40 g/L into an aqueous potassium hydroxide solution with a specific gravity of 1.3. After the alkaline electrolyte solution was injected into the battery case, the opening of the battery case was sealed with the sealing plate electrically connected to the positive electrode current-collecting plate and equipped with a gasket disposed around the peripheral edge thereof. As a result, a nickel-metal hydride battery was produced.

(vi) High-Temperature Life Characteristics

The nickel-metal hydride batteries of the Examples and the Comparative Examples were charged at a 10-hour rate (150 mA) under a 40° C. atmosphere for 15 hours; and then, discharged at a 5-hour rate (300 mA) until the battery voltage became 1.0 V. This charge-discharge cycle was repeated 100 times. The ratio of: the discharge capacity at the $100^{th}$ cycle; relative to the discharge capacity at the $2^{nd}$ cycle, was obtained in percentage as the capacity retention rate.

For Examples 1 to 18 and Comparative Examples 1 to 10, compositions of the hydrogen-absorbing alloy are shown in Table 1 and evaluation results are shown in Table 2.

TABLE 1

General Formula: $Mm_{1-a}Mg_aNi_xAl_yMn_zCo_bFe_c$

| | a | b | c | x | y | z | y+z | x+y+z+b+c |
|---|---|---|---|---|---|---|---|---|
| Comp. Ex. 1 | 0.01 | 0.2 | 0.3 | 3.6 | 0.5 | 1 | 1.5 | 5.6 |
| Ex. 1 | 0.05 | 0.2 | 0.3 | 3.6 | 0.5 | 1 | 1.5 | 5.6 |
| Ex. 2 | 0.3 | 0.2 | 0.3 | 3.6 | 0.5 | 1 | 1.5 | 5.6 |
| Ex. 3 | 0.5 | 0.2 | 0.3 | 3.6 | 0.5 | 1 | 1.5 | 5.6 |
| Comp. Ex. 2 | 0.6 | 0.2 | 0.3 | 3.6 | 0.5 | 1 | 1.5 | 5.6 |
| Comp. Ex. 3 | 0.3 | 0.6 | 0.6 | 2.4 | 0.7 | 1.3 | 2 | 5.6 |
| Ex. 4 | 0.3 | 0.6 | 0.6 | 2.5 | 0.7 | 1.3 | 2 | 5.7 |
| Ex. 5 | 0.3 | 0.1 | 0.2 | 3.3 | 0.7 | 1.3 | 2 | 5.6 |
| Ex. 6 | 0.3 | 0.1 | 0.1 | 4.5 | 0.4 | 0.8 | 1.2 | 5.9 |
| Comp. Ex. 4 | 0.3 | 0.1 | 0.1 | 4.8 | 0.2 | 0.6 | 0.8 | 5.8 |
| Comp. Ex. 5 | 0.3 | 0.6 | 0.6 | 4.5 | 0.01 | 0.01 | 0.02 | 5.72 |
| Ex. 7 | 0.3 | 0.6 | 0.6 | 4.35 | 0.02 | 0.03 | 0.05 | 5.6 |
| Ex. 8 | 0.3 | 0.3 | 0.3 | 4 | 0.4 | 0.8 | 1.2 | 5.8 |
| Ex. 9 | 0.3 | 0.3 | 0.3 | 3.3 | 0.7 | 1.3 | 2 | 5.9 |
| Comp. Ex. 6 | 0.3 | 0.3 | 0.3 | 3 | 0.7 | 1.5 | 2.2 | 5.8 |
| Ex. 10 | 0.3 | 0 | 0.3 | 3.6 | 0.6 | 1.1 | 1.7 | 5.6 |
| Ex. 11 | 0.3 | 0.3 | 0.3 | 3.6 | 0.5 | 1.1 | 1.6 | 5.8 |
| Ex. 12 | 0.3 | 0.6 | 0.3 | 3.6 | 0.4 | 0.8 | 1.2 | 5.7 |
| Comp. Ex. 7 | 0.3 | 0.7 | 0.3 | 3.6 | 0.4 | 0.8 | 1.2 | 5.8 |
| Ex. 13 | 0.3 | 0.3 | 0 | 3.6 | 0.6 | 1.1 | 1.7 | 5.6 |
| Ex. 14 | 0.3 | 0.3 | 0.3 | 3.6 | 0.5 | 0.9 | 1.4 | 5.6 |
| Ex. 15 | 0.3 | 0.3 | 0.6 | 3.6 | 0.4 | 0.8 | 1.2 | 5.7 |
| Comp. Ex. 8 | 0.3 | 0.3 | 0.7 | 3.6 | 0.4 | 0.8 | 1.2 | 5.8 |
| Comp. Ex. 9 | 0.3 | 0.3 | 0.3 | 3.3 | 0.5 | 1 | 1.5 | 5.4 |
| Ex. 16 | 0.3 | 0.3 | 0.3 | 3.3 | 0.6 | 1.1 | 1.7 | 5.6 |
| Ex. 17 | 0.3 | 0.3 | 0.3 | 3.3 | 0.7 | 1.2 | 1.9 | 5.8 |
| Ex. 18 | 0.3 | 0.3 | 0.4 | 3.3 | 0.7 | 1.3 | 2 | 6 |
| Comp. Ex. 10 | 0.3 | 0.3 | 0.5 | 3.3 | 0.7 | 1.3 | 2 | 6.1 |

TABLE 2

| | PCT Capacity (mAh/g) | Elution Concentration (ppm) | | | Battery Evaluation Capacity Retention Rate (%) |
|---|---|---|---|---|---|
| | | Mn | Al | Co | |
| Comp. Ex. 1 | 264 | 50 | 18 | 1.5 | 67 |
| Ex. 1 | 310 | 56 | 19 | 1.6 | 87 |
| Ex. 2 | 320 | 49 | 20 | 2.1 | 87 |
| Ex. 3 | 315 | 51 | 22 | 2 | 87 |
| Comp. Ex. 2 | 280 | 48 | 19 | 1.7 | 70 |
| Comp. Ex. 3 | 230 | 62 | 32 | 2.8 | 72 |
| Ex. 4 | 318 | 64 | 28 | 2.6 | 88 |
| Ex. 5 | 325 | 60 | 35 | 1.1 | 87 |
| Ex. 6 | 330 | 42 | 18 | 1.2 | 86 |
| Comp. Ex. 4 | 250 | 33 | 15 | 0.9 | 65 |
| Comp. Ex. 5 | 180 | 8 | 4 | 3.4 | 64 |
| Ex. 7 | 307 | 12 | 8 | 3 | 84 |
| Ex. 8 | 320 | 48 | 18 | 1.8 | 87 |
| Ex. 9 | 318 | 63 | 32 | 1.7 | 88 |
| Comp. Ex. 6 | 305 | 95 | 56 | 1.9 | 73 |
| Ex. 10 | 328 | 61 | 23 | 0 | 87 |
| Ex. 11 | 330 | 58 | 21 | 1.8 | 87 |
| Ex. 12 | 338 | 43 | 16 | 3.3 | 87 |
| Comp. Ex. 7 | 323 | 44 | 14 | 5.8 | 70 |
| Ex. 13 | 333 | 59 | 21 | 1.9 | 87 |
| Ex. 14 | 328 | 51 | 18 | 2.1 | 87 |
| Ex. 15 | 310 | 48 | 15 | 2 | 86 |
| Comp. Ex. 8 | 240 | 45 | 18 | 1.7 | 65 |
| Comp. Ex. 9 | 281 | 52 | 19 | 2.1 | 68 |
| Ex. 16 | 330 | 59 | 20 | 2 | 87 |
| Ex. 17 | 325 | 58 | 30 | 1.8 | 87 |
| Ex. 18 | 328 | 60 | 33 | 1.9 | 88 |
| Comp. Ex. 10 | 275 | 59 | 35 | 1.9 | 65 |

In Comparative Example 1 in which "a" was less than 0.015, the effect of adding Mg was excessively small, and thus, capacity and capacity retention rate were both low. On the other hand, in Comparative Example 2 in which "a" exceeded 0.5, segregation of Mg became apparent, and thus, capacity and capacity retention rate were both low. Therefore, the range of "a" is required to be 0.015 or more and 0.5 or less.

In Comparative Example 3 in which "x" was less than 2.5, the degree of activity of the hydrogen-absorbing alloy was low, and thus, capacity and capacity retention rate were both low. On the other hand, in Comparative Example 4 in which "x" exceeded 4.5, capacity and capacity retention rate were both low. Although details are not known, capacity may have lowered possibly due to a distortion caused by the excessive Ni amount, resulting in formation of a pair of dumbbell-shaped atoms in a $CaCu_5$-type crystal. Therefore, the range of "x" is required to be 2.5 or more and 4.5 or less.

In Comparative Example 5 in which "y+z" was less than 0.05, capacity and capacity retention rate were both low due to an increase in equilibrium pressure of hydrogen. On the other hand, in Comparative Example 6 in which "y+z" exceeded 2, elution of Mn and Al into the alkaline electrolyte solution was excessive, and thus, high-temperature life characteristics degraded. Therefore, the range of "y+z" is required to be 0.05 or more and 2 or less.

In Comparative Example 7 in which "b" exceeded 0.6, elution of Co into the alkaline electrolyte solution was excessive, and thus, high-temperature life characteristics degraded. Therefore, the range of "b" is required to be 0.6 or less.

In Comparative Example 8 in which "c" exceeded 0.6, segregation of Fe and thus oxidation and passivation thereof occurred. Thus, since absorption and desorption of hydrogen was inhibited, capacity was low. Therefore, the range of "c" is required to be 0.6 or less.

In Comparative Example 9 in which "x+y+z+b+c" was less than 5.6, amorphorization of the Group 2A element at Site A and Ni at Site B was not promoted, and thus, capacity and capacity retention rate were both low. On the other hand, in Comparative Example 10 in which "x+y+z+b+c" exceeded 6, composition became exceedingly non-stoichiometric, and thus, capacity and capacity retention rate were both low. Therefore, the range of "x+y+z+b+c" is required to be 5.6 or more and 6 or less.

For Examples 19 to 36 and Comparative Examples 11 to 20, compositions of the hydrogen-absorbing alloy are shown in Table 3 and evaluation results are shown in Table 4.

TABLE 3

General Formula: $La_{1-a}Mg_aNi_xAl_yMn_zCo_bFe_c$

|  | a | b | c | x | y | z | y+z | x+y+z+b+c |
|---|---|---|---|---|---|---|---|---|
| Comp. Ex. 11 | 0.01 | 0.2 | 0.3 | 3.6 | 0.5 | 1 | 1.5 | 5.6 |
| Ex. 19 | 0.05 | 0.2 | 0.3 | 3.6 | 0.5 | 1 | 1.5 | 5.6 |
| Ex. 20 | 0.3 | 0.2 | 0.3 | 3.6 | 0.5 | 1 | 1.5 | 5.6 |
| Ex. 21 | 0.5 | 0.2 | 0.3 | 3.6 | 0.5 | 1 | 1.5 | 5.6 |
| Comp. Ex. 12 | 0.6 | 0.2 | 0.3 | 3.6 | 0.5 | 1 | 1.5 | 5.6 |
| Comp. Ex. 13 | 0.3 | 0.6 | 0.6 | 2.4 | 0.7 | 1.3 | 2 | 5.6 |
| Ex. 22 | 0.3 | 0.6 | 0.6 | 2.5 | 0.7 | 1.3 | 2 | 5.7 |
| Ex. 23 | 0.3 | 0.1 | 0.2 | 3.3 | 0.7 | 1.3 | 2 | 5.6 |
| Ex. 24 | 0.3 | 0.1 | 0.1 | 4.5 | 0.4 | 0.8 | 1.2 | 5.9 |
| Comp. Ex. 14 | 0.3 | 0.1 | 0.1 | 4.8 | 0.2 | 0.6 | 0.8 | 5.8 |
| Comp. Ex. 15 | 0.3 | 0.6 | 0.6 | 4.5 | 0.01 | 0.01 | 0.02 | 5.72 |
| Ex. 25 | 0.3 | 0.6 | 0.6 | 4.35 | 0.02 | 0.03 | 0.05 | 5.6 |
| Ex. 26 | 0.3 | 0.3 | 0.3 | 4 | 0.4 | 0.8 | 1.2 | 5.8 |
| Ex. 27 | 0.3 | 0.3 | 0.3 | 3.3 | 0.7 | 1.3 | 2 | 5.9 |
| Comp. Ex. 16 | 0.3 | 0.3 | 0.3 | 3 | 0.7 | 1.5 | 2.2 | 5.8 |
| Ex. 28 | 0.3 | 0 | 0.3 | 3.6 | 0.6 | 1.1 | 1.7 | 5.6 |
| Ex. 29 | 0.3 | 0.3 | 0.3 | 3.6 | 0.5 | 1.1 | 1.6 | 5.8 |
| Ex. 30 | 0.3 | 0.6 | 0.3 | 3.6 | 0.4 | 0.8 | 1.2 | 5.7 |
| Comp. Ex. 17 | 0.3 | 0.7 | 0.3 | 3.6 | 0.4 | 0.8 | 1.2 | 5.8 |
| Ex. 31 | 0.3 | 0.3 | 0 | 3.6 | 0.6 | 1.1 | 1.7 | 5.6 |
| Ex. 32 | 0.3 | 0.3 | 0.3 | 3.6 | 0.5 | 0.9 | 1.4 | 5.6 |
| Ex. 33 | 0.3 | 0.3 | 0.6 | 3.6 | 0.4 | 0.8 | 1.2 | 5.7 |
| Comp. Ex. 18 | 0.3 | 0.3 | 0.7 | 3.6 | 0.4 | 0.8 | 1.2 | 5.8 |
| Comp. Ex. 19 | 0.3 | 0.3 | 0.3 | 3.3 | 0.5 | 1 | 1.5 | 5.4 |
| Ex. 34 | 0.3 | 0.3 | 0.3 | 3.3 | 0.6 | 1.1 | 1.7 | 5.6 |
| Ex. 35 | 0.3 | 0.3 | 0.3 | 3.3 | 0.7 | 1.2 | 1.9 | 5.8 |
| Ex. 36 | 0.3 | 0.3 | 0.4 | 3.3 | 0.7 | 1.3 | 2 | 6 |
| Comp. Ex. 20 | 0.3 | 0.3 | 0.5 | 3.3 | 0.7 | 1.3 | 2 | 6.1 |

TABLE 4

|  | PCT Capacity (mAh/g) | Elution Concentration (ppm) | | | Battery Evaluation Capacity Retention Rate (%) |
|---|---|---|---|---|---|
|  |  | Mn | Al | Co |  |
| Comp. Ex. 11 | 251 | 50 | 18 | 1.5 | 72 |
| Ex. 19 | 316 | 56 | 19 | 1.6 | 90 |
| Ex. 20 | 326 | 49 | 20 | 2.1 | 90 |
| Ex. 21 | 321 | 51 | 22 | 2 | 90 |
| Comp. Ex. 12 | 266 | 48 | 19 | 1.7 | 75 |
| Comp. Ex. 13 | 219 | 62 | 32 | 2.8 | 65 |
| Ex. 22 | 324 | 64 | 28 | 2.6 | 90 |
| Ex. 23 | 332 | 60 | 35 | 1.1 | 90 |
| Ex. 24 | 337 | 42 | 18 | 1.2 | 89 |
| Comp. Ex. 14 | 238 | 33 | 15 | 0.9 | 68 |
| Comp. Ex. 15 | 171 | 8 | 4 | 3.4 | 70 |
| Ex. 25 | 313 | 12 | 8 | 3 | 87 |
| Ex. 26 | 326 | 48 | 18 | 1.8 | 89 |
| Ex. 27 | 324 | 63 | 32 | 1.7 | 90 |
| Comp. Ex. 16 | 290 | 95 | 56 | 1.9 | 66 |
| Ex. 28 | 335 | 61 | 23 | 0 | 90 |
| Ex. 29 | 337 | 58 | 21 | 1.8 | 90 |
| Ex. 30 | 345 | 43 | 16 | 3.3 | 90 |
| Comp. Ex. 17 | 307 | 44 | 14 | 5.8 | 59 |
| Ex. 31 | 340 | 59 | 21 | 1.9 | 90 |
| Ex. 32 | 335 | 51 | 18 | 2.1 | 90 |
| Ex. 33 | 316 | 48 | 15 | 2 | 89 |
| Comp. Ex. 18 | 228 | 45 | 18 | 1.7 | 70 |
| Comp. Ex. 19 | 267 | 52 | 19 | 2.1 | 68 |
| Ex. 34 | 337 | 59 | 20 | 2 | 90 |
| Ex. 35 | 332 | 58 | 30 | 1.8 | 90 |
| Ex. 36 | 335 | 60 | 33 | 1.9 | 90 |
| Comp. Ex. 20 | 261 | 59 | 35 | 1.9 | 70 |

In Comparative Example 11 in which "a" was less than 0.015, the effect of adding Mg was excessively small, and thus, capacity and capacity retention rate were both low. On the other hand, in Comparative Example 12 in which "a" exceeded 0.5, segregation of Mg became apparent, and thus, capacity and capacity retention rate were both low. Therefore, the range of "a" is required to be 0.015 or more and 0.5 or less.

In Comparative Example 13 in which "x" was less than 2.5, the degree of activity of the hydrogen-absorbing alloy was low, and thus, capacity and capacity retention rate were both low. On the other hand, in Comparative Example 14 in which "x" exceeded 4.5, capacity and capacity retention rate were both low. Although details are not known, capacity may have lowered possibly due to a distortion caused by the excessive Ni amount, resulting in the formation of a pair of dumbbell-shaped atoms in a $CaCu_5$-type crystal. Therefore, the range of "x" is required to be 2.5 or more and 4.5 or less.

In Comparative Example 15 in which "y+z" was less than 0.05, capacity and capacity retention rate were both low due to an increase in equilibrium pressure of hydrogen. On the other hand, in Comparative Example 16 in which "y+z" exceeded 2, elution of Mn and Al into the alkaline electrolyte solution was excessive, and thus, high-temperature life characteristics lowered. Therefore, the range of "y+z" is required to be 0.05 or more and 2 or less.

In Comparative Example 17 in which "b" exceeded 0.6, elution of Co into the alkaline electrolyte solution was excessive, and thus, high-temperature life characteristics degraded. Therefore, the range of "b" is required to be 0.6 or less.

In Comparative Example 18 in which "c" exceeded 0.6, segregation of Fe and thus oxidation and passivation thereof occurred. Thus, since absorption and desorption of hydrogen was inhibited, capacity was low. Therefore, the range of "c" is required to be 0.6 or less.

In Comparative Example 19 in which "x+y+z+b+c" was less than 5.6, since amorphorization of the Group 2A element at Site A and Ni at Site B was not promoted, capacity and capacity retention rate were both low.

On the other hand, in Comparative Example 20 in which "x+y+z+b+c" exceeded 6, composition became exceedingly non-stoichiometric, and thus, capacity and capacity retention rate were both low. Therefore, the range of "x+y+z+b+c" is required to be 5.6 or more and 6 or less.

For Examples 37 to 51 and Comparative Examples 21 to 28, compositions of the hydrogen-absorbing alloy are shown in Table 5 and evaluation results are shown in Table 6.

TABLE 5

General Formula: $La_{1-a}Mg_aNi_xAl_yMn_zFe_bSn_e$

| | a | d | e | x | y | z | y+z | x+y+z+d+e |
|---|---|---|---|---|---|---|---|---|
| Comp. Ex. 21 | 0.01 | 0.3 | 0.2 | 3.6 | 0.5 | 1 | 1.5 | 5.6 |
| Ex. 37 | 0.05 | 0.3 | 0.2 | 3.6 | 0.5 | 1 | 1.5 | 5.6 |
| Ex. 38 | 0.3 | 0.3 | 0.2 | 3.6 | 0.5 | 1 | 1.5 | 5.6 |
| Ex. 39 | 0.5 | 0.3 | 0.2 | 3.6 | 0.5 | 1 | 1.5 | 5.6 |
| Comp. Ex. 22 | 0.6 | 0.3 | 0.2 | 3.6 | 0.5 | 1 | 1.5 | 5.6 |
| Comp. Ex. 23 | 0.3 | 0.6 | 0.6 | 2.4 | 0.7 | 1.3 | 2 | 5.6 |
| Ex. 40 | 0.3 | 0.6 | 0.6 | 2.5 | 0.7 | 1.3 | 2 | 5.7 |
| Ex. 41 | 0.3 | 0.2 | 0.1 | 3.3 | 0.7 | 1.3 | 2 | 5.6 |
| Ex. 42 | 0.3 | 0.1 | 0.1 | 4.5 | 0.4 | 0.8 | 1.2 | 5.9 |
| Comp. Ex. 24 | 0.3 | 0.1 | 0.1 | 4.8 | 0.2 | 0.6 | 0.8 | 5.8 |
| Comp. Ex. 25 | 0.3 | 0.6 | 0.6 | 4.5 | 0.01 | 0.01 | 0.02 | 5.72 |
| Ex. 43 | 0.3 | 0.6 | 0.6 | 4.35 | 0.02 | 0.03 | 0.05 | 5.6 |
| Ex. 44 | 0.3 | 0.3 | 0.3 | 4 | 0.4 | 0.8 | 1.2 | 5.8 |
| Ex. 45 | 0.3 | 0.3 | 0.3 | 3.3 | 0.7 | 1.3 | 2 | 5.9 |
| Comp. Ex. 26 | 0.3 | 0.3 | 0.3 | 3 | 0.7 | 1.5 | 2.2 | 5.8 |
| Ex. 46 | 0.3 | 0.3 | 0 | 3.6 | 0.6 | 1.1 | 1.7 | 5.6 |
| Ex. 47 | 0.3 | 0.3 | 0.3 | 3.6 | 0.5 | 1.1 | 1.6 | 5.8 |
| Ex. 48 | 0.3 | 0.3 | 0.6 | 3.6 | 0.4 | 0.8 | 1.2 | 5.7 |
| Comp. Ex. 27 | 0.3 | 0.3 | 0.3 | 3.3 | 0.5 | 1 | 1.5 | 5.4 |
| Ex. 49 | 0.3 | 0.3 | 0.3 | 3.3 | 0.6 | 1.1 | 1.7 | 5.6 |
| Ex. 50 | 0.3 | 0.3 | 0.3 | 3.3 | 0.7 | 1.2 | 1.9 | 5.8 |
| Ex. 51 | 0.3 | 0.4 | 0.3 | 3.3 | 0.7 | 1.3 | 2 | 6 |
| Comp. Ex. 28 | 0.3 | 0.5 | 0.3 | 3.3 | 0.7 | 1.3 | 2 | 6.1 |

TABLE 6

| | PCT Capacity (mAh/g) | Elution Concentration (ppm) | | Battery Evaluation Capacity Retention Rate (%) |
|---|---|---|---|---|
| | | Mn | Al | |
| Comp. Ex. 21 | 253 | 50 | 18 | 72 |
| Ex. 37 | 313 | 56 | 19 | 92 |
| Ex. 38 | 323 | 49 | 20 | 92 |
| Ex. 39 | 318 | 51 | 22 | 92 |
| Comp. Ex. 22 | 269 | 48 | 19 | 68 |
| Comp. Ex. 23 | 221 | 62 | 32 | 69 |
| Ex. 40 | 321 | 64 | 28 | 92 |
| Ex. 41 | 328 | 60 | 35 | 92 |
| Ex. 42 | 333 | 42 | 18 | 92 |
| Comp. Ex. 24 | 240 | 33 | 15 | 72 |
| Comp. Ex. 25 | 173 | 8 | 4 | 70 |
| Ex. 43 | 310 | 12 | 8 | 92 |
| Ex. 44 | 323 | 48 | 18 | 92 |
| Ex. 45 | 321 | 63 | 32 | 92 |
| Comp. Ex. 26 | 293 | 95 | 56 | 81 |
| Ex. 46 | 331 | 61 | 23 | 92 |
| Ex. 47 | 333 | 58 | 21 | 92 |
| Ex. 48 | 341 | 43 | 16 | 92 |
| Comp. Ex. 27 | 270 | 52 | 19 | 74 |
| Ex. 49 | 333 | 59 | 20 | 92 |
| Ex. 50 | 328 | 58 | 30 | 92 |
| Ex. 51 | 331 | 60 | 33 | 92 |
| Comp. Ex. 28 | 264 | 59 | 35 | 73 |

In Comparative Example 21 in which "a" was less than 0.015, the effect of adding Mg was excessively small, and thus, capacity and capacity retention rate were both low. On the other hand, in Comparative Example 22 in which "a" exceeded 0.5, segregation of Mg became apparent, and thus, capacity and capacity retention rate were both low. Therefore, the range of "a" is required to be 0.05 or more and 0.5 or less.

In Comparative Example 23 in which "x" was less than 2.5, the degree of activity of the hydrogen-absorbing alloy was low, and thus, capacity and capacity retention rate were both low. On the other hand, in Comparative Example 24 in which "x" exceeded 4.5, capacity and capacity retention rate were both low. Although details are not known, capacity may have lowered possibly due to a distortion caused by the excessive Ni amount, resulting in formation of a pair of dumbbell-shaped atoms in a $CaCu_5$-type crystal. Therefore, the range of "x" is required to be 2.5 or more and 4.5 or less.

In Comparative Example 25 in which "y+z" was less than 0.05, capacity and capacity retention rate were both low due to an increase in equilibrium pressure of hydrogen. On the other hand, in Comparative Example 26 in which "y+z" exceeded 2, elution of Mn and Al into the alkaline electrolyte solution was excessive, and thus, high-temperature life characteristics degraded. Therefore, the range of "y+z" is required to be 0.05 or more and 2 or less.

If "e" exceeds 0.6, there is a possibility of capacity becoming low, due to Segregation of Sn and thus oxidation and passivation thereof, thereby causing disturbance on absorption and desorption of hydrogen. Therefore, the range of "e" is required to be 0.6 or less.

In Comparative Example 27 in which "x+y+z b+c" (however, b=0) was less than 5.6, amorphorization of the Group 2A element at Site A and Ni at Site B was not promoted, and thus, capacity and capacity retention rate were both low. On the other hand, in Comparative Example 28 in which "x+y+z+b+c" exceeded 6, since composition became exceedingly non-stoichiometric, capacity and capacity retention rate were both low. Therefore, the range of "x+y+z+b+c" is required to be 5.6 or more and 6 or less.

(vii) Surface Treatment Using Alkaline Aqueous Solution

Surface treatment using an alkaline aqueous solution was performed on the hydrogen-absorbing alloy power fabricated in Examples 10 to 12, Comparative Examples 6 to 7, Examples 28 to 30, Comparative Examples 16 to 17, Examples 46 to 48 and Comparative Examples 26 to 27, thereby fabricating the hydrogen-absorbing alloy powder for Examples 52 to 54, Comparative Examples 29 to 30, Examples 55 to 57, Comparative Examples 31 to 32, Examples 58 to 60 and Comparative Examples 33 to 34, respectively.

First, an aqueous KOH solution having a concentration of 18 mol/L was prepared. Then, treatment of the hydrogen-absorbing alloy powder was performed by mixing the aqueous KOH solution with a predetermined hydrogen-absorbing alloy powder, and then stirring the mixture for 30 minutes at 100° C. The treated powder was washed with water as well as dealkalized, and dehydrated into a powder with a water content of 3.5%.

For Examples 52 to 60 and Comparative Examples 29 to 34, other than using the hydrogen-absorbing alloy powder that underwent treatment as mentioned above, negative electrodes and nickel-metal hydride batteries were fabricated in the same manner as Example 1 and high-temperature life characteristics were evaluated. Compositions of the hydrogen-absorbing alloy powder are shown in Table 7 and evaluation results are shown in Table 8.

TABLE 7

General Formula: $Mm_{1-a}Mg_aNi_xAl_yMn_zCo_bFe_c$

|  | a | b | c | x | y | z | y + z | x + y + z + b + c |
|---|---|---|---|---|---|---|---|---|
| Comp. Ex. 29 | 0.3 | 0.3 | 0.3 | 3 | 0.7 | 1.5 | 2.2 | 5.8 |
| Ex. 52 | 0.3 | 0 | 0.3 | 3.6 | 0.6 | 1.1 | 1.7 | 5.6 |
| Ex. 53 | 0.3 | 0.3 | 0.3 | 3.6 | 0.5 | 1.1 | 1.6 | 5.8 |
| Ex. 54 | 0.3 | 0.6 | 0.3 | 3.6 | 0.4 | 0.8 | 1.2 | 5.7 |
| Comp. Ex. 30 | 0.3 | 0.7 | 0.3 | 3.6 | 0.4 | 0.8 | 1.2 | 5.8 |

General Formula: $La_{1-a}Mg_aNi_xAl_yMn_zCo_bFe_c$

| Comp. Ex. 31 | 0.3 | 0.3 | 0.3 | 3 | 0.7 | 1.5 | 2.2 | 5.8 |
| Ex. 55 | 0.3 | 0 | 0.3 | 3.6 | 0.6 | 1.1 | 1.7 | 5.6 |
| Ex. 56 | 0.3 | 0.3 | 0.3 | 3.6 | 0.5 | 1.1 | 1.6 | 5.8 |
| Ex. 57 | 0.3 | 0.6 | 0.3 | 3.6 | 0.4 | 0.8 | 1.2 | 5.7 |
| Comp. Ex. 32 | 0.3 | 0.7 | 0.3 | 3.6 | 0.4 | 0.8 | 1.2 | 5.8 |

General Formula: $La_{1-a}Mg_aNi_xAl_yMn_zFe_dSn_e$

|  | a | d | e | x | y | z | y + z | x + y + z + d + e |
|---|---|---|---|---|---|---|---|---|
| Comp. Ex. 33 | 0.3 | 0.3 | 0.3 | 3 | 0.7 | 1.5 | 2.2 | 5.8 |
| Ex. 58 | 0.3 | 0.3 | 0 | 3.6 | 0.6 | 1.1 | 1.7 | 5.6 |
| Ex. 59 | 0.3 | 0.3 | 0.3 | 3.6 | 0.5 | 1.1 | 1.6 | 5.8 |
| Ex. 60 | 0.3 | 0.3 | 0.6 | 3.6 | 0.4 | 0.8 | 1.2 | 5.7 |
| Comp. Ex. 34 | 0.3 | 0.3 | 0.3 | 3.3 | 0.5 | 1 | 1.5 | 5.4 |

TABLE 8

|  | PCT Capacity (mAh/g) | Elution Concentration (ppm) | | | Battery Evaluation Capacity Retention Rate (%) |
|---|---|---|---|---|---|
|  |  | Mn | Al | Co |  |
| Comp. Ex. 29 | 305 | 77 | 50 | 1.9 | 73 |
| Ex. 52 | 328 | 49 | 21 | 0 | 90 |
| Ex. 53 | 330 | 47 | 19 | 1.8 | 90 |
| Ex. 54 | 338 | 35 | 14 | 3.3 | 91 |
| Comp. Ex. 30 | 323 | 36 | 13 | 5.8 | 79 |
| Comp. Ex. 31 | 290 | 77 | 50 | 1.9 | 74 |
| Ex. 55 | 335 | 49 | 21 | 0 | 91 |
| Ex. 56 | 337 | 47 | 19 | 1.8 | 92 |
| Ex. 57 | 345 | 35 | 14 | 3.3 | 92 |
| Comp. Ex. 32 | 307 | 36 | 13 | 5.8 | 75 |

|  | PCT Capacity (mAh/g) | Elution Concentration (ppm) | | Battery Evaluation Capacity Retention Rate (%) |
|---|---|---|---|---|
|  |  | Mn | Al |  |
| Comp. Ex. 33 | 293 | 69 | 45 | 74 |
| Ex. 58 | 331 | 44 | 19 | 93 |
| Ex. 59 | 333 | 42 | 17 | 93 |
| Ex. 60 | 341 | 31 | 13 | 92 |
| Comp. Ex. 34 | 310 | 32 | 11 | 69 |

In the case of a hydrogen-absorbing alloy power represented by a general formula: $Mm_{1-a}T^1_aNi_xAl_yMn_zCO_bT^2_c$ in Comparative Example 29 in which "y+z" exceeded 2, elution of Mn and Al into the alkaline electrolyte solution was excessive, and thus, high-temperature life characteristics degraded. In addition, in Comparative Example 30 in which "b" exceeded 0.6, elution of Co into the alkaline electrolyte solution was excessive, and thus, high-temperature life characteristics degraded.

As above, even in the case of performing treatment using an alkaline aqueous solution, it is dominant that compositions of the hydrogen-absorbing alloy powder are as those of Examples 1 to 18. However, the hydrogen-absorbing alloy powder that underwent treatment using an alkaline aqueous solution had higher PCT capacities as well as higher capacity retention rates. Although details on this are not known, there is a possibility that a catalytically-active layer promoting absorption and desorption of hydrogen is formed on the surface of the hydrogen-absorbing alloy powder.

In the case of a hydrogen-absorbing alloy power represented by a general formula: $La_{1-a}Mg_aNi_xAl_yMn_zCO_bFe_c$, in Comparative Example 31 in which "y+z" exceeded 2.0, elution of Mn and Al into the alkaline electrolyte solution was excessive, and thus, high-temperature life characteristics degraded. In addition, in Comparative Example 32 in which "b" exceeded 0.6, elution of Co into the alkaline electrolyte solution was excessive, and thus, high-temperature life characteristics degraded.

As above, even in the case of performing treatment by using an alkaline aqueous solution, it is dominant that compositions of the hydrogen-absorbing alloy powder are as those of Examples 19 to 36. However, the hydrogen-absorbing alloy powder that underwent treatment using an alkaline aqueous solution had higher PCT capacities as well as higher capacity retention rates.

In the case of a hydrogen-absorbing alloy power represented by a general formula: $La_{1-a}Mg_aNi_xAl_yMn_zFe_dSn_e$, in Comparative Example 33 in which "y+z" exceeded 2.0, elution of Mn and Al into the alkaline electrolyte solution was excessive, and thus, high-temperature life characteristics degraded. In addition, in Comparative Example 34 in which "x+y+z+d+e" was less than 5.6, amorphization of the Group 2A element at Site A and Ni at Site B was not promoted, and thus, capacity and capacity retention rate were both low.

As above, even in the case of performing treatment using an alkaline aqueous solution, it is dominant that the compositions of the hydrogen-absorbing alloy powder are as those of Examples 37 to 51. The hydrogen-absorbing alloy powder that underwent treatment using an alkaline aqueous solution had higher PCT capacities as well as higher capacity retention rates.

INDUSTRIAL APPLICABILITY

According to the present invention, high-temperature life characteristics can be greatly improved, and higher capacity can also be achieved for nickel-metal hydride batteries. Nickel-metal hydride batteries that use the present invention are applicable as a power supply for various equipments, but are remarkably effective in the field of power supply for hybrid cars used under particularly harsh environments.

The invention claimed is:

1. A negative electrode material for a nickel-metal hydride battery comprising a hydrogen-absorbing alloy represented by a general formula: $Mm_{1-a}T^1_aNi_xAl_yMn_zCo_bT^2_c$, wherein:
   Mm is at least one of light rare earth elements;
   $T^1$ is at least one element selected from the group consisting of Mg, Ca, Sr and Ba;
   $T^2$ is at least one element selected from the group consisting of Sn, Cu and Fe; and
   $0.015 \leq a \leq 0.5$, $2.5 \leq x \leq 4.5$, $0.05 \leq y+z \leq 2$, $0 \leq b \leq 0.6$, $0 \leq c \leq 0.6$ and $5.6 \leq x+y+z+b+c \leq 6$ are satisfied.

2. The negative electrode material for a nickel-metal hydride battery in accordance with claim 1, wherein Mm is La.

3. The negative electrode material for a nickel-metal hydride battery in accordance with claim 1, which has been subjected to coming into contact with an alkaline aqueous solution to be activated.

4. A nickel-metal hydride battery comprising a positive electrode, a negative electrode and an alkaline electrolyte solution, wherein said negative electrode includes the negative electrode material for a nickel-metal hydride battery in accordance with claim 1.

5. A method for treating a negative electrode material for a nickel-metal hydride battery, comprising the step of bringing into contact with an alkaline aqueous solution, the negative electrode material for a nickel-metal hydride battery in accordance with claim 1.

6. The method for treating a negative electrode material for a nickel-metal hydride battery in accordance with claim 5, wherein said alkaline aqueous solution contains at least one of sodium hydroxide and potassium hydroxide.

7. The method for treating a negative electrode material for a nickel-metal hydride battery in accordance with claim 6, wherein the potassium hydroxide concentration is 3 to 20 mol/L and the sodium hydroxide concentration is 10 to 20 mol/L in said alkaline aqueous solution.

8. The method for treating a negative electrode material for a nickel-metal hydride battery in accordance with claim 5, wherein the temperature of said alkaline aqueous solution is 80 to 150° C.

9. The method for treating a negative electrode material for a nickel-metal hydride battery in accordance with claim 5, wherein said negative electrode material is stirred in said alkaline aqueous solution.

10. A negative electrode material for a nickel-metal hydride battery comprising a hydrogen-absorbing alloy represented by a general formula:

$Mm_{1-a}T^1{}_aNi_xAl_yMn_zT^2{}_c$, wherein:

Mm is at least one of light rare earth elements;

$T^1$ is Mg;

$T^2{}_c$ is $Fe_dSn_e$, and d+e=c; and $0.015 \leq a \leq 0.5$, $2.5 \leq x \leq 4.5$, $0.05 \leq y+z \leq 2$, $0 \leq c \leq 1.2$ and $5.6 \leq x+y+z+c \leq 6$ are satisfied.

* * * * *